United States Patent
Jha et al.

(10) Patent No.: US 11,542,034 B2
(45) Date of Patent: Jan. 3, 2023

(54) SET OF EXTERIOR AIRCRAFT LIGHTS AND AIRCRAFT COMPRISING SUCH A SET OF EXTERIOR AIRCRAFT LIGHTS

(71) Applicant: Goodrich Lighting Systems GmbH & Co. KG, Lippstadt (DE)

(72) Inventors: Anil Kumar Jha, Lippstadt (DE); Jens Leuschner, Moehnesee (DE)

(73) Assignee: Goodrich Lighting Systems GmbH & Co. KG, Lippstadt (DE)

( * ) Notice: Subject to any disclaimer, the term of this patent is extended or adjusted under 35 U.S.C. 154(b) by 0 days.

(21) Appl. No.: 17/566,868

(22) Filed: Dec. 31, 2021

(65) Prior Publication Data

US 2022/0219834 A1    Jul. 14, 2022

(30) Foreign Application Priority Data

Jan. 8, 2021  (EP) .................................... 21150758

(51) Int. Cl.
*B64D 47/04* (2006.01)
*F21V 5/04* (2006.01)
(Continued)

(52) U.S. Cl.
CPC ................ *B64D 47/04* (2013.01); *F21V 5/04* (2013.01); *F21V 23/003* (2013.01); *F21V 23/0442* (2013.01); *F21W 2107/30* (2018.01)

(58) Field of Classification Search
CPC ....... B64D 47/04; F21V 5/04; F21W 2107/30
See application file for complete search history.

(56) References Cited

U.S. PATENT DOCUMENTS 8,579,480 B2   11/2013  Willeke et al.
8,773,044 B2   7/2014   Hessling
(Continued)

FOREIGN PATENT DOCUMENTS

EP   2995501   3/2016
EP   3073249   9/2016
(Continued)

OTHER PUBLICATIONS

EPO, Extended Search Report dated Jun. 15, 2021 in EP Serial No. 21150758.7.

(Continued)

*Primary Examiner* — Rajarshi Chakraborty
*Assistant Examiner* — Michael Chiang
(74) *Attorney, Agent, or Firm* — Snell & Wilmer L.L.P.

(57) ABSTRACT

A set of exterior aircraft lights, comprises a main landing light, which comprises at least one main landing light source and is configured for emitting a main landing light beam around a main landing light beam direction (L), and at least one of a taxi light and a runway turn-off light. The taxi light is configured for emitting a taxi light beam around a taxi light beam direction (T) and for emitting a first auxiliary landing light beam around a first auxiliary landing light beam direction ($AL_1$), wherein the first auxiliary landing light beam direction ($AL_1$), when projected onto a vertical plane, is angled downwards between 5° and 15° with respect to the straight ahead direction. The runway turn-off light is configured for emitting a runway turn-off light beam around a runway turn-off light beam direction ($R_a$, $R_b$).

15 Claims, 5 Drawing Sheets

(51) Int. Cl.
*F21V 23/00* (2015.01)
*F21V 23/04* (2006.01)
*F21W 107/30* (2018.01)

(56) References Cited

U.S. PATENT DOCUMENTS

| | | | |
|---|---|---|---|
| 9,635,739 | B2 | 4/2017 | Schoen et al. |
| 10,253,466 | B2 | 4/2019 | Messiou et al. |
| 10,299,343 | B2 | 5/2019 | Klein et al. |
| 10,408,706 | B2 | 9/2019 | Larsen et al. |
| 10,513,349 | B2 | 12/2019 | Jha et al. |
| 2008/0137353 | A1* | 6/2008 | Larsen ................ B64D 47/04 362/470 |
| 2011/0198997 | A1* | 8/2011 | Curtis ................ B64D 47/04 315/77 |
| 2017/0355470 | A1* | 12/2017 | Keller ................ B64D 47/04 |
| 2018/0141677 | A1* | 5/2018 | Lapujade ................ F21V 7/06 |
| 2018/0334264 | A1* | 11/2018 | Jha ................ B64D 47/04 |
| 2019/0032879 | A1* | 1/2019 | Tsao ................ B64D 47/04 |
| 2019/0124739 | A1 | 4/2019 | Spinivasamurthy et al. |
| 2019/0193868 | A1* | 6/2019 | Trinschek ................ H05B 45/37 |

FOREIGN PATENT DOCUMENTS

| | | |
|---|---|---|
| EP | 3095641 | 11/2016 |
| EP | 3095709 | 11/2016 |

OTHER PUBLICATIONS

European Patent Office, Extended Search Report dated Jun. 11, 2021 in EP Serial No. 21150757.9.

* cited by examiner

SET OF EXTERIOR AIRCRAFT LIGHTS AND AIRCRAFT COMPRISING SUCH A SET OF EXTERIOR AIRCRAFT LIGHTS

CROSS-REFERENCE TO RELATED APPLICATIONS

This application claims priority to, and the benefit of, European Patent Application No. 21150758.7, having DAS code 0AEA, filed Jan. 8, 2021 and titled "SET OF EXTERIOR AIRCRAFT LIGHTS AND AIRCRAFT COMPRISING SUCH A SET OF EXTERIOR AIRCRAFT LIGHTS," which application is incorporated herein by reference in its entirety for all purposes.

FIELD

The present invention is in the field of exterior aircraft lights. The present invention is in particular related to a set of exterior aircraft lights, to a method of operating such a set of exterior aircraft lights, and to an aircraft comprising such a set of exterior aircraft lights

BACKGROUND

Almost all aircraft are equipped with exterior aircraft lights. In particular, large passenger airplanes have a wide variety of exterior aircraft lights. Examples include take-off and/or landing lights, taxi lights, navigation lights and anti-collision lights.

Landing lights are configured for illuminating a landing area, in particular a runway, in front of the aircraft during a landing approach in a dark environment, in particular at night. When projected onto a horizontal plane, a landing light beam, emitted by a landing light, is directed in a straight-ahead direction, which coincides with or is oriented parallel to a longitudinal direction of the aircraft.

While such an orientation of the landing light beam provides for good illumination during normal landings, in which the direction of flight, when projected onto a horizontal plane, corresponds to the longitudinal axis of the aircraft, the straight ahead orientation of the landing light beam may result in an insufficient illumination of the landing area in situations, such as cross-wind landings, in which the nose of the aircraft is not directed straight ahead towards the landing area.

Accordingly, it would be beneficial to provide exterior aircraft lighting which allows for improving the illumination of the landing area during a landing approach, in particular under circumstances in which the nose of the aircraft is not directed straight ahead towards the intended landing area.

SUMMARY

Exemplary embodiments of the invention include a set of exterior aircraft lights that comprises a main landing light, and at least one of a taxi light and a runway turn-off light. The main landing light comprises at least one main landing light source and is configured for emitting a main landing light beam around a main landing light beam direction.

The taxi light comprises at least one taxi light source and is configured for emitting a taxi light beam around a taxi light beam direction, which is oriented in a straight-ahead direction. The taxi light further comprises at least one first auxiliary landing light source, also referred to as taxi light auxiliary landing light source, and is configured for emitting a first auxiliary landing light beam around a first auxiliary landing light beam direction.

When projected onto a horizontal plane, the first auxiliary landing light beam direction may be oriented in the straight-ahead direction. When projected onto a vertical plane, which is oriented perpendicularly to the horizontal plane, the first auxiliary landing light beam direction is angled downwards between 5° and 15°, in particular 10°, with respect to the straight-ahead direction.

The at least one taxi light source and the at least one first auxiliary landing light source are controllable independently of each other. The at least one taxi light source and the at least one first auxiliary landing light source may in particular be activated and deactivated independently of each other.

The runway turn-off light comprises at least one runway turn-off light source and is configured for emitting a runway turn-off light beam around a runway turn-off light beam direction. The runway turn-off light further comprises at least one second auxiliary landing light source, also referred to as runway turn-off light auxiliary landing light source, and is configured for emitting a second auxiliary landing light beam around a second auxiliary landing light beam direction.

When projected onto the horizontal plane, the second auxiliary landing light beam direction may be oriented along the runway turn-off light beam direction. When projected onto the vertical plane, the second auxiliary landing light beam direction is angled downwards between 5° and 15°, in particular 10°, with respect to the runway turn-off light beam direction.

The at least one runway turn-off light source and the at least one second auxiliary landing light source are controllable independently of each other. The at least one runway turn-off light source and the at least one second auxiliary landing light source may in particular be activated and deactivated independently of each other.

Exemplary embodiments of the invention also include a method of operating a set of exterior aircraft lights according to an exemplary embodiment of the invention. The method includes simultaneously operating the at least one main landing light source together with at least one of the at least one taxi light source and the at least one runway turn-off light source, and together with at least one of the at least one first auxiliary landing light source and the at least one second auxiliary landing light source.

The method in particular includes activating the at least one main landing light source together with said at least one of the at least one taxi light source and the at least one runway turn-off light source, and together with said at least one of the at least one first auxiliary landing light source and the at least one second auxiliary landing light source, during a landing approach of an aircraft.

According to exemplary embodiments of the invention, the first and second auxiliary landing light beams are inclined towards the ground similar to the main landing light beam. In consequence, the first and second auxiliary landing light beams provide additional illumination of the ground in front of the aircraft. The additional illumination may provide for enhanced visibility of the landing target in the course of a landing approach, in particular in situations, such as cross-wind landings, in which the longitudinal axis of the aircraft, when projected onto a horizontal plane, is not oriented in the direction of flight.

As a result, the illumination of the ground in front of the aircraft and the safety of the aircraft during the landing approach may be considerably enhanced.

In an embodiment, the main landing light beam has an opening angle α in the range of between 4° and 10°, in particular an opening angle of between 4° and 8°, further in particular an opening angle α of 6°, i.e. an opening angle of +/−3° with respect to the main landing light beam direction. The main landing light beam may in particular be a conical light beam, having a substantially circular cross-section in all planes perpendicular to the main landing light beam direction. Alternatively, the opening angle $\alpha_V$ of the main landing light beam in the vertical direction may be larger than the opening angle $\alpha_H$ of the main landing light beam in the horizontal direction. The main landing light beam may in particular have a basically elliptical cross-section in each cross-sectional plane oriented perpendicularly to the main landing light beam direction. It is also possible that the main landing light beam has an irregular shape.

In an embodiment, the taxi light beam has a horizontal opening angle $\beta_H$ in the range of between 30° and 50°, in particular a horizontal opening angle $\beta_H$ of approximately 40°, i.e. +/−20°, with respect to the taxi light beam direction, in the horizontal direction, and a vertical opening angle $\beta_V$ in the range of between 10° and 30°, in particular a vertical opening angle $\beta_V$ angle of approximately 20°, i.e. +/−10°, with respect to the taxi light beam direction, in the vertical direction.

In an embodiment, the first auxiliary landing light beam, also referred to as taxi light landing light beam, has a vertical opening angle $\beta'_V$ in the vertical plane, which is similar to the vertical opening angle βv of the taxi light beam, i.e. a vertical opening angle $\beta'_V$ in the range of between 10° and 30°, in particular a vertical opening angle $\beta'_V$ angle of approximately 20°, i.e. +/−10°, with respect to the first auxiliary landing light beam direction.

In an embodiment, the first auxiliary landing light beam has a horizontal opening angle β'H in the horizontal plane, which is similar to the horizontal opening angle $\beta_H$ of the taxi light beam, i.e. a horizontal opening angle β'H in the range of between 30° and 50°, in particular a horizontal opening angle β'H of approximately 40°, i.e. +/−20°, with respect to the first auxiliary landing light beam direction.

In an embodiment, the runway turn-off light beam has a horizontal opening angle $\gamma_H$ in the horizontal direction in the range of between 30° and 50°, in particular a horizontal opening angle $\gamma_H$ of approximately 40°, i.e. +/−20°, with respect to the respective runway turn-off light beam direction. In the vertical direction, the runway turn-off light beam has a vertical opening angle $\gamma_V$ in the range of between 10° and 30°, in particular a vertical opening angle $\gamma_V$ of approximately 20°, i.e. +/−10°, with respect to the respective runway turn-off light beam direction.

In an embodiment, the second auxiliary landing light beam, also referred to as runway turn-off light landing light beam, has a vertical opening angle $\gamma'_V$ in the vertical plane in the range of between 10° and 30°, in particular a vertical opening angle $\gamma'_V$ of approximately 20°, i.e. +/−10°, with respect to the respective the second auxiliary landing light beam direction.

In an embodiment, the second auxiliary landing light beam has a horizontal opening angle $\gamma_H$ in the horizontal plane in the range of between 30° and 50°, in particular a vertical opening angle of approximately 40°, i.e. +/−20°, with respect to the respective the second auxiliary landing light beam direction.

The above-mentioned opening angles have been found as resulting in a good illumination of the area in front of the aircraft during a landing approach and in the course of taxiing on the ground, without glaring the pilots of other aircraft.

In an embodiment, the main landing light beam direction, when projected onto a horizontal plane, is oriented in the straight-ahead direction. Such an orientation of the main landing light beam direction has been found as well-suited for illuminating the ground during "normal" landing approaches, in which the nose of the aircraft is oriented straight ahead.

In an embodiment, the runway turn-off light beam direction and the second auxiliary landing light beam direction, when projected onto a horizontal plane, are oriented at an angle Θ between 30° and 60°, in particular at an angle Θ in the range of between 30° and 50°, in particular at an angle Θ in the range of between 40° and 50°, more particularly at an angle Θ of 45°, with respect to the straight ahead direction.

Such an orientation of the runway turn-off light beam direction has been found as well suited for illuminating areas of the ground into which the aircraft may move when turning while taxiing.

Such an orientation of the second auxiliary landing light beam direction has been found as being well-suited for illuminating the ground during "abnormal" landing approaches, such as cross-wind landings, in which the nose of the aircraft is not oriented straight-ahead.

In an embodiment, the set of exterior aircraft lights further comprises a taxi light temperature sensor and a taxi light controller. The taxi light temperature sensor is configured for detecting a temperature at the taxi light, in particular a temperature within the taxi light, more particularly a temperature at the at least one taxi light source. The taxi light controller is configured for controlling the operation of the at least one first auxiliary landing light source and/or the at least one taxi light source as a function of the temperature detected by the taxi light temperature sensor.

In an embodiment, the taxi light controller is configured for dimming or deactivating the at least one first auxiliary landing light source and/or the at least one taxi light source when the detected temperature exceeds a predefined temperature threshold value.

Such a configuration may prevent the taxi light from overheating. It further may allow for automatically deactivating the first auxiliary landing light source after landing, when the temperature at the taxi light increases, because the cooling airflow, passing the taxi light during the landing approach, is considerably reduced when the aircraft is taxiing on the ground with considerably lower speed.

In an embodiment, the set of exterior aircraft lights further comprises a runway turn-off light temperature sensor and a runway turn-off light controller. The runway turn-off light temperature sensor is configured for detecting a temperature at the runway turn-off light, in particular a temperature within the runway turn-off light, more particularly a temperature at the at least one runway turn-off light source. The runway turn-off light controller is configured for controlling the operation of the at least one second auxiliary landing light source and/or the at least one runway turn-off light source as a function of the temperature detected by the runway turn-off light temperature sensor.

In an embodiment, the runway turn-off light controller is configured for dimming or deactivating the at least one second auxiliary landing light source and/or the at least one runway turn-off light source when the detected temperature exceeds a predefined temperature threshold value.

Such a configuration may prevent the runway turn-off light from overheating. It may further allow for automatically deactivating the second auxiliary landing light source after landing, when the temperature at the runway turn-off light increases, because the cooling airflow, passing the runway turn-off light during the landing approach, is considerably reduced when the aircraft is taxiing on the ground with considerably lower speed.

If the set of exterior aircraft lights comprises both, a taxi light and a runway turn-off light, the taxi light controller and the runway turn-off light controller may be integrated into a single controller, which is configured for controlling the operation of the taxi light as well as the operation of the runway turn-off light.

Exemplary embodiments of the invention also include an aircraft comprising a set of exterior aircraft lights according to an exemplary embodiment of the invention.

In such an aircraft, the main landing light may be mounted to a front landing gear of the aircraft. A taxi light and/or a runway turn-off light may be mounted to the front landing gear of the aircraft or to a wing, in particular to a wing root region, of the aircraft.

In an embodiment, when viewed in a projection onto the horizontal plane, the landing light is mounted at a position on the longitudinal axis of the aircraft, and the main landing light beam direction extends in the straight ahead direction, which coincides with the longitudinal axis of the aircraft.

In an alternative embodiment, the landing light is mounted at a position which, when projected onto a horizontal plane, is not located on but spaced apart from the longitudinal axis of the aircraft. The landing light, for example may be mounted to a wing, in particular to a wing root, of the aircraft.

In such an embodiment, in which the exterior aircraft light is not located on the longitudinal axis of the aircraft, the main landing light beam direction extends parallel to the longitudinal axis of the aircraft in the near field, i.e. in relatively small distances from the aircraft, which are close to the dimensions of the aircraft. When viewed from distances which are large compared to the dimensions of the aircraft, i.e. in the far field, the comparatively small distance between the landing light and the longitudinal axis of the aircraft is negligible, and the projection of the landing light beam direction onto a horizontal plane may be considered as coinciding with the longitudinal axis of the aircraft.

In an embodiment, the main landing light beam direction, when projected onto the vertical plane, is oriented downwards at an angle $\phi$ between 5° and 15°, in particular at an angle $\phi$ between 6° and 12°, more particularly at an angle $\phi$ of 10°, with respect to the straight ahead direction in order to illuminate the ground in front of the aircraft during a landing approach.

In an embodiment, the taxi light beam direction is oriented straight ahead in the horizontal plane. The taxi light beam direction is also oriented substantially straight ahead in the vertical plane. The taxi light beam direction may in particular be oriented such that the center of the taxi light beam meets the ground in a distance of between 30 m and 35 m, in particular in a distance of 33 m (100 feet), in front of the aircraft.

When the taxi light is mounted to the aircraft at a position on the longitudinal axis of the aircraft, the taxi light beam direction extends substantially along said longitudinal axis.

When the taxi light is mounted to the aircraft at a position, which is not located on but spaced apart from the longitudinal axis, the taxi light beam direction extends substantially parallel the longitudinal axis in the near field, i.e. in distances which are relatively small when compared to the dimensions of the aircraft. When viewed from distances which a large compared to the dimensions of the aircraft, i.e. in the far field, the distance between the taxi light and the longitudinal axis of the aircraft is negligible and, thus, the taxi light beam direction may be considered as substantially coinciding with the longitudinal axis of the aircraft.

In an embodiment, the runway turn-off light beam direction is oriented substantially horizontally, e.g. along a nearly horizontal line, when projected onto the vertical plane. The runway turn-off light beam direction may in particular be oriented such that the center of the runway turn-off light beam meets the ground at a position, which is located between 15 m and 20 m, in particular 16.7 m (50 feet), in front of the aircraft and 25 m to 30 m, in particular 26.7 m (80 feet), to the side of the longitudinal axis of the aircraft.

When the runway turn-off light is mounted to the aircraft at a position on the longitudinal axis of the aircraft, the runway turn-off light beam direction extends substantially along the longitudinal axis of the aircraft when projected onto the vertical plane.

When the runway turn-off light is mounted to the aircraft at a position, which is not located on but spaced apart from the longitudinal axis, the runway turn-off light beam direction, when projected onto the vertical plane, extends substantially parallel the longitudinal axis in the near field, i.e. in distances which are relatively small compared to the dimensions of the aircraft. When viewed from distances which are large compared to the dimensions of the aircraft, i.e. in the far field, the distance between the runway turn-off light and the longitudinal axis of the aircraft is negligible and, thus, the projection of the runway turn-off light beam direction onto the vertical plane may be considered as substantially coinciding with the longitudinal axis of the aircraft.

In the far field, the longitudinal axis of the aircraft is considered as corresponding to the straight-ahead direction.

In an embodiment, the aircraft comprises two runway turn-off lights, and the runway turn-off light beam directions of the two runway turn-off lights diverge symmetrically on both sides of the aircraft. Such a configuration allows for illuminating areas on both sides of the aircraft with the runway turn-off lights.

In an embodiment, the method of operating a set of exterior aircraft lights according to an exemplary embodiment of the invention includes monitoring the temperature of the taxi light and/or the temperature of the runway turn-off light, and the method further includes dimming and/or deactivating the at least one first auxiliary landing light source and/or the at least one second auxiliary landing light source when the detected temperature exceeds a predefined temperature threshold value.

In a further embodiment, the method additionally includes dimming or deactivating the at least one taxi light source and/or the at least one runway turn-off light source when the detected temperature exceeds the predefined temperature threshold value for a predetermined amount of time, after the at least one first auxiliary landing light source and/or the at least one second auxiliary landing light source have been dimmed or deactivated.

Dimming and/or deactivating selected light sources in reaction to a detected temperature, in particular when the detected temperature exceeds a predefined temperature threshold value, may prevent the taxi light and/or the runway turn-off light from overheating. It may further allow for automatically deactivating the first and/or second auxiliary landing light sources after the aircraft has landed. During a landing approach, the exterior aircraft lights are cooled by a flow of cold air passing by. When the aircraft is taxiing with much lower speed on the ground, the cooling airflow is considerably reduced. This results in an increase of the temperatures, detected at the taxi light and/or at the runway turn-off light, respectively, which may cause the auxiliary landing light sources to be automatically deactivated sometime after the aircraft has landed. The usability of the set of exterior aircraft lights may be enhanced, as there is no need for manually deactivating the first and second auxiliary landing light sources, after the aircraft has landed.

BRIEF DESCRIPTION OF THE DRAWINGS

In the following, exemplary embodiments of the invention are described with respect to the accompanying drawings, wherein:

FIG. 1A is a schematic top view of an aircraft 100, comprising a fuselage 102 extending along a longitudinal axis A of the aircraft 100, and two wings 104, 106, laterally extending from the fuselage 102. FIG. 1B shows a schematic side view of the aircraft 100. The aircraft 100 may for example be a passenger airplane, in particular a large commercial passenger airplane.

DETAILED DESCRIPTION

The aircraft 100 comprises a set 1 of exterior aircraft lights, including a plurality of exterior aircraft lights 2, 4, 6a, 6b.

Figure 1A:
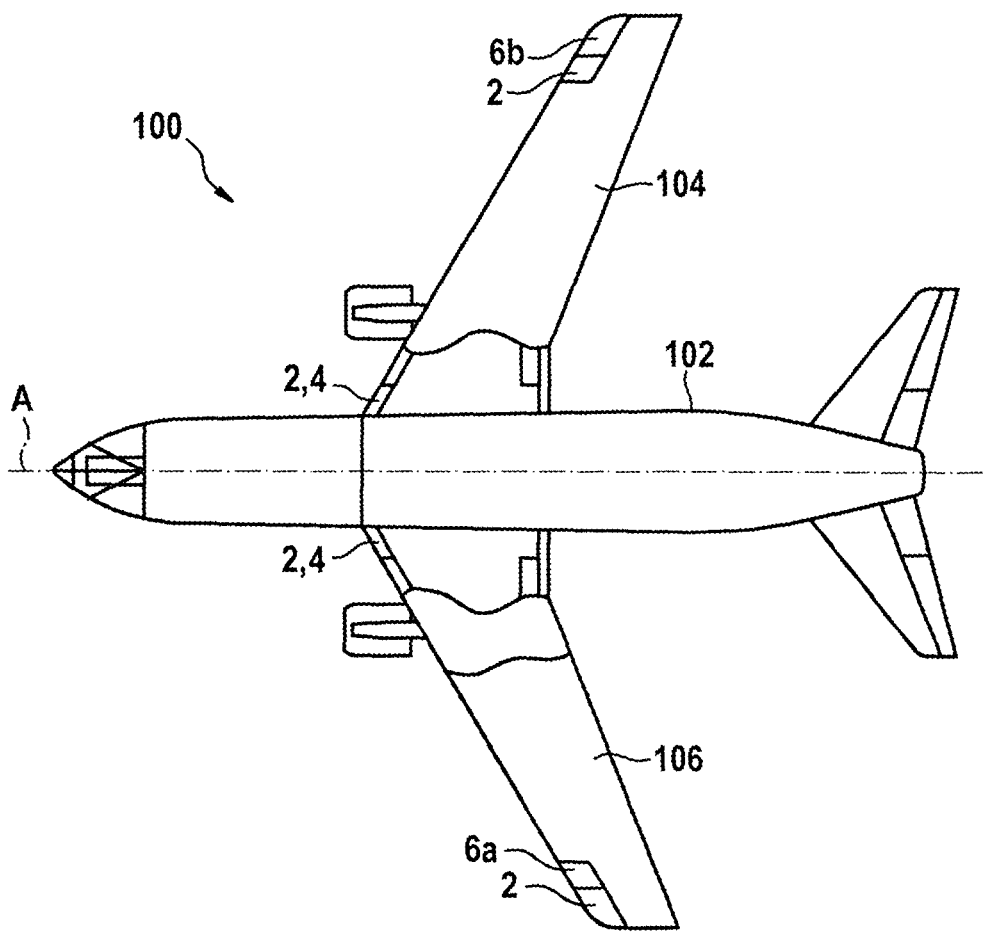
FIG. 1A is a schematic top view of an aircraft according to an exemplary embodiment of the invention, the aircraft comprising a set of exterior aircraft lights according to an exemplary embodiment of the invention.
Figure 1B:
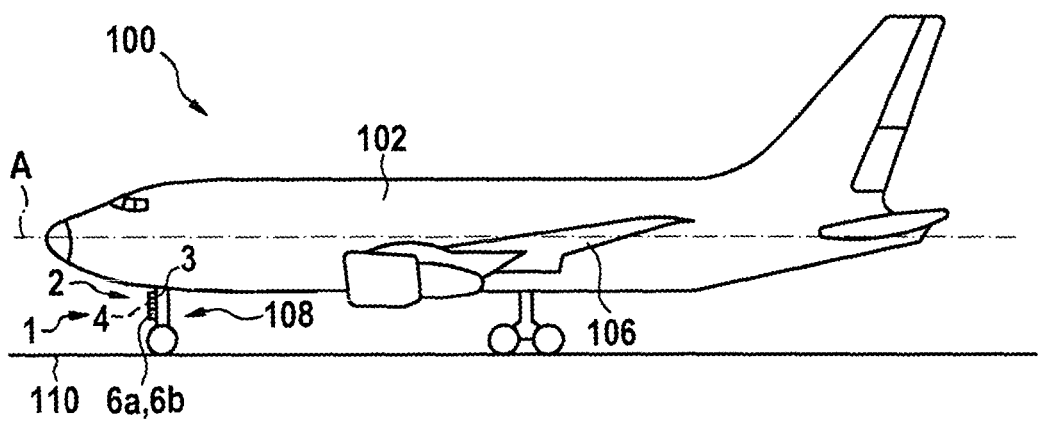
FIG. 1B shows a schematic side view of the aircraft depicted in FIG. 1A.

The exterior aircraft lights 2, 4, 6a, 6b may for example be mounted to a front gear 108 of the aircraft 100, as depicted in FIG. 1B. The exterior aircraft lights 2, 4, 6a, 6b may also be mounted to the roots and/or to the tips of the wings 104, 106 of the aircraft 100, as shown in FIG. 1A.

The exterior aircraft lights 2, 4, 6a, 6b may in particular include one or more main landing lights and/or take-off lights 2, including main landing light sources 3 and/or take-off light sources 3, which are activated during landing and/or take-off of the aircraft 100, respectively. The exterior aircraft lights 2, 4, 6a, 6b may further include one or more taxi lights 4 and/or one or more runway turn-off flights 6a, 6b, which are configured for illuminating the ground in the vicinity of the aircraft 100 when the aircraft 100 is taxiing on the ground 110.

Only an exemplary selection of exterior aircraft lights 2, 4, 6a, 6b is depicted in FIGS. 1A and 1B. The skilled person understands that an aircraft 100 may comprise further exterior aircraft lights 2, 4, 6a, 6b in addition or as an alternative to the exterior aircraft lights 2, 4, 6a, 6b, depicted in FIGS. 1A and 1B. The exterior aircraft lights of the aircraft 100 may for example further include navigation lights and anti-collision lights, which are not shown in the figures and which are configured for indicating the position of the aircraft 100.

Figure 2A:
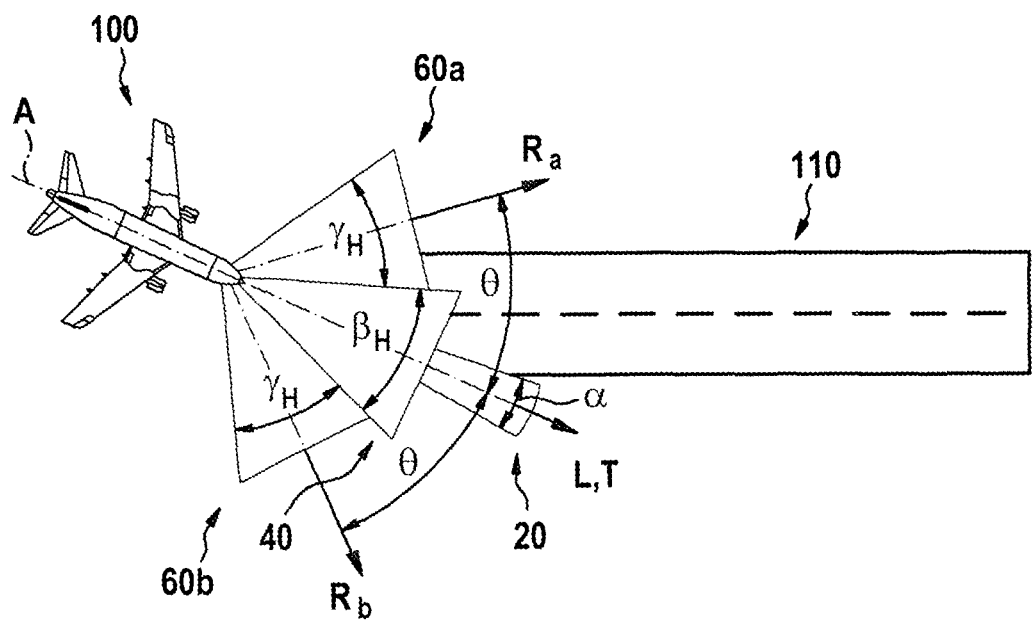
FIG. 2A is a top view of an aircraft, comprising conventional exterior aircraft lights, during a landing approach.
Figure 2B:
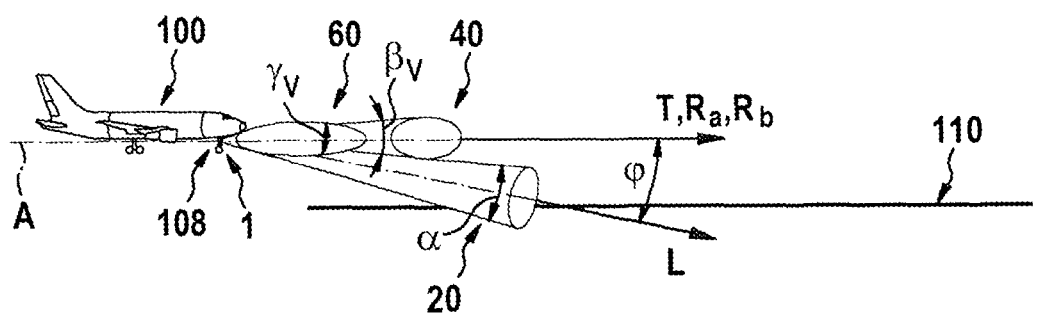
FIG. 2B is a side view of the aircraft depicted in FIG. 2A during the landing approach.

FIGS. 2A and 2B depict an aircraft 100, comprising a conventional set 1 of exterior aircraft lights mounted to a front portion, in particular to the front gear 108, of the aircraft 100, in the course of a landing approach. FIG. 2A is a planar top view of the aircraft 100, and FIG. 2B is a side view thereof.

In FIGS. 2A and 2B, the main landing light 2, the taxi light 4 and two runway turn-off lights 6a, 6b are activated, and the light beams 20, 40, 60a, 60b, emitted by these exterior aircraft lights 2, 4, 6a, 6b, are schematically shown in these figures.

The main landing light 2 emits a main landing light beam 20 around a main landing light beam direction L. When projected onto a horizontal plane (see FIG. 2A), the main landing light beam direction L extends in a straight-ahead direction, which coincides with the longitudinal axis A of the aircraft 100. In an alternative embodiment, which is not explicitly shown in the figures, in which the main landing light 2 is mounted to one of the wings 104, 106 of the aircraft 100, the main landing light beam direction L does not coincide with the longitudinal axis A of the aircraft 100, but extends basically parallel thereto.

However, when viewed from distances which are large compared to the dimensions of the aircraft 100, i.e. in the far field, the comparatively small distance between the main landing light 2 and the longitudinal axis A of the aircraft 100 is negligible, and the projection of the main landing light beam direction L onto a horizontal plane may be considered as coinciding with the longitudinal axis A of the aircraft 100.

When projected onto a vertical plane, the main landing light beam direction L is oriented downwards at an angle $\phi$ of between 5° and 15°, in particular at an angle $\phi$ of between 6° and 10°, further in particular at an angle of 10°, with respect to the straight ahead direction and the longitudinal axis A of the aircraft 100 (see FIG. 2B). In consequence, the main landing light beam 20 illuminates an area of the ground 110 in front of the aircraft 100.

The main landing light beam 20 has an opening angle $\alpha$ in the range of between 4° to 10°, in particular an opening angle $\alpha$ of approximately 6°, i.e. an opening angle of +/−3°, with respect to the main landing light beam direction L. The main landing light beam 20 in particular may be conical having a substantially circular cross-section in all cross-sectional planes extending perpendicular to the main landing light beam direction L. Alternatively, the opening angle $\alpha_V$ of the main landing light beam in the vertical direction may be larger than the opening angle $\alpha_H$ of the main landing light beam in the horizontal direction. The main landing light beam 20, in particular, may have a basically elliptical cross-section in each cross-sectional plane, which is oriented perpendicular to the main landing light beam direction L.

The taxi light 4 is configured for illuminating an area in front of the aircraft 100 when the aircraft 100 is taxiing on the ground 110. In particular, the taxi light 4 emits a taxi light beam 40 around a taxi light beam direction T, which is also oriented straight ahead when viewed in the horizontal plane (see FIG. 2A). Contrary to the main landing light beam 20, the taxi light beam 40 is not inclined downwards with respect to the straight-ahead direction. Instead, the taxi light beam direction T is oriented basically along or parallel to the straight-ahead direction, when projected onto the vertical plane (see FIG. 2B). The taxi light beam 40 may have a taxi light beam light intensity that is lower than a main landing light beam light intensity, as emitted by the main landing light 2. The taxi light beam light intensity, for example, may be in the range of 5% to 15%, in particular at about 10%, of the main landing light beam light intensity.

When projected onto the vertical plane in the near field close to the aircraft 100, the taxi light beam direction T is oriented basically parallel to the longitudinal axis A of the aircraft 100. In the far field, i.e. from distances which are large compared to the dimensions of the aircraft 100, the taxi light beam direction T may be considered as coinciding with the longitudinal axis A of the aircraft 100.

In the horizontal direction, the taxi light beam 40 has a horizontal opening angle $\beta_H$ in the range of between 30° and 50°, in particular a horizontal opening angle $\beta_H$ of approximately 40°, i.e. a horizontal opening angle $\beta_H$ of +/−20°, with respect to the taxi light beam direction T (see FIG. 2A). In the vertical direction, the taxi light beam 40 has a vertical opening angle $\beta_V$ in the range of between 10° and 30°, in particular a vertical opening angle $\beta_V$ angle of approximately 20°, i.e. a vertical opening angle $\beta_V$ of +/−10°, with respect to the taxi light beam direction T (see FIG. 2B).

The runway turn-off lights 6 are provided for illuminating areas of the ground 110 located laterally in front of the aircraft 100, i.e. areas the aircraft 100 may turn into, when turning while taxiing on the ground 110.

Each runway turn-off light 6a, 6b emits a runway turn-off light beam 60a, 60b around a runway turn-off light beam direction $R_a$, $R_b$, respectively. When projected onto a horizontal plane (see FIG. 2A), the runway turn-off light beam directions $R_a$, $R_b$ are inclined with respect to the longitudinal axis A of the aircraft 100. Each runway turn-off light beam direction $R_a$, $R_b$ may in particular be inclined with respect to the longitudinal axis A of the aircraft 100 by an angle Θ of 30° to 60°, in particular at angle Θ between 40° and 50°, more particularly at an angle Θ of 45°.

The two-runway turn-off light beam directions $R_a$, $R_b$ are inclined towards opposite sides of the aircraft 100. Thus, a first runway turn-off light beam 60a extends to the left side of the aircraft 100, and a second runway turn-off light beam 60b extends to the right side of the aircraft 100. The runway turn-off light beams 60a, 60b may have a runway turn-off light beam light intensity that is lower than the main landing light beam light intensity, as emitted by the main landing light 2. The runway turn-off light beam light intensity, for example, may be in the range of 5% to 15%, in particular at about 10%, of the main landing light beam light intensity.

When projected onto a vertical plane (see FIG. 2B), the runway turn-off light beam directions $R_a$, $R_b$ are oriented along the straight-ahead direction.

When the runway turn-off lights 6a, 6b are mounted at the height of the longitudinal axis A of the aircraft 100, the projections of the runway turn-off light beam directions $R_a$, $R_b$ onto the vertical plane extend along the projection of the longitudinal axis A of the aircraft 100.

When the runway turn-off light 6a, 6b are mounted at a height above or below the longitudinal axis A of the aircraft 100, the projections of the runway turn-off light beam directions $R_a$, $R_b$ onto the vertical plane extend parallel to the projection of the longitudinal axis A of the aircraft 100. In the far field, i.e. at distances which are large compared to the dimensions of the aircraft 100, the runway turn-off light beam directions $R_a$, $R_b$ may be considered as coinciding with the longitudinal axis A of the aircraft 100.

In the horizontal direction, each of the runway turn-off light beams 60a, 60b has a horizontal opening angle $\gamma_H$ in the range of between 30° and 50°, in particular a horizontal opening angle $\gamma_H$ of approximately 40°, i.e. +/−20°, with respect to the respective runway turn-off light beam direction $R_a$, $R_b$ (see FIG. 2A). In the vertical direction, each of the runway turn-off light beams 60a, 60b has a vertical opening angle $\gamma_V$ in the range of between 10° and 30°, in particular a vertical opening angle $\gamma_V$ of approximately 20°, i.e. +/−10°, with respect to the respective runway turn-off light beam direction $R_a$, $R_b$ (see FIG. 2B).

When the longitudinal axis A of the aircraft 100 is not oriented straight ahead in the direction of flight, for example during a cross-wind landing, a substantial portion of the relatively narrow main landing light beam 20 will miss the runway 110 (see FIG. 2A). Since the taxi light beam 40 and the runway turn-off light beams 60a, 60b are oriented basically horizontally, these light beams 40, 60a, 60b will not substantially illuminate the runway 110, either. As a result, in such a situation, the aircraft 100 will descend towards a basically non-illuminated area of the ground 110. This is unsatisfactory to the pilot and may cause severe safety issues, since potential obstacles on the ground 110 are barely visible to the pilot.

Figure 3A:
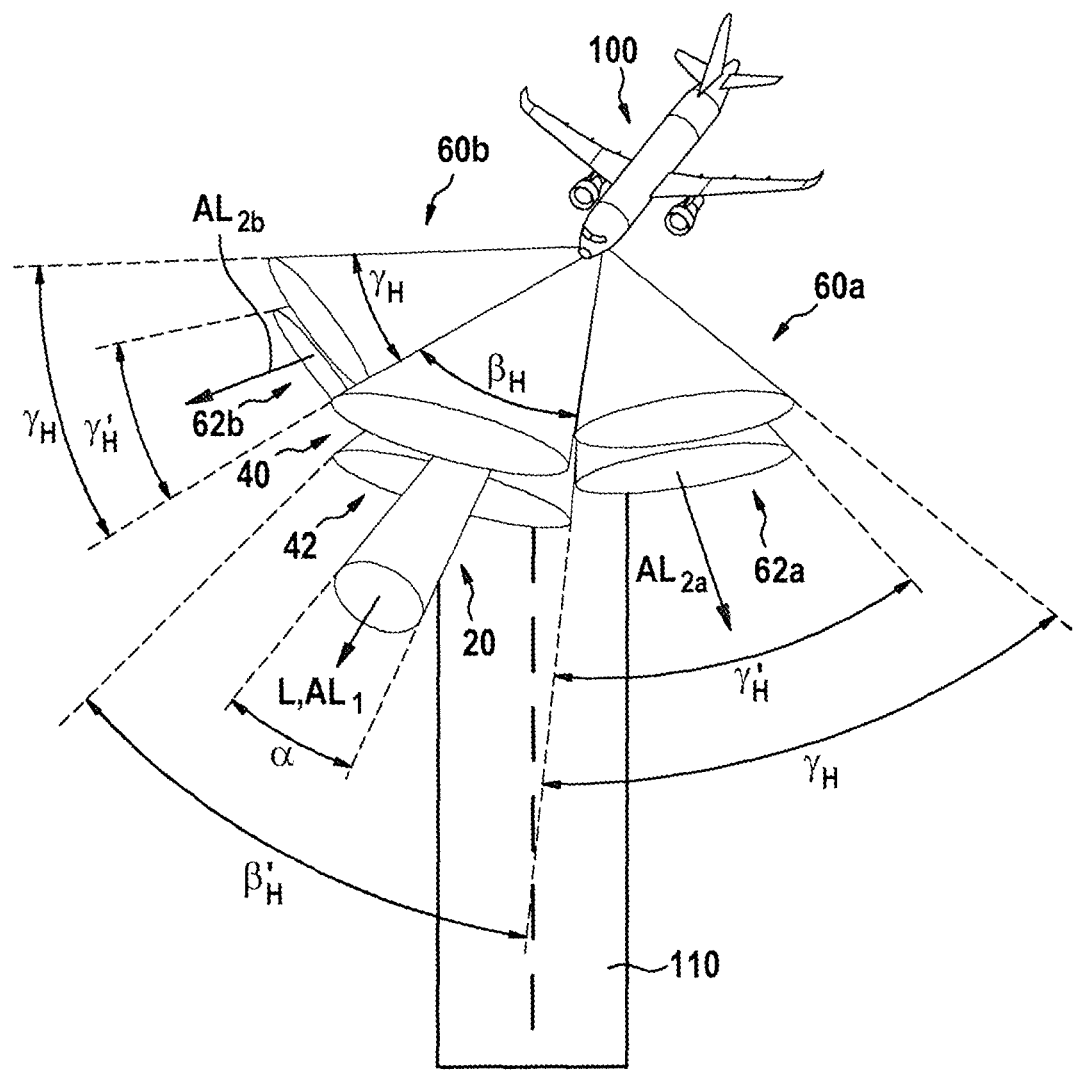
FIG. 3A is a perspective top view of an aircraft in accordance with an exemplary embodiment of the invention, the aircraft comprising a set of exterior aircraft lights according to an exemplary embodiment of the invention, during a landing approach.
Figure 3B:
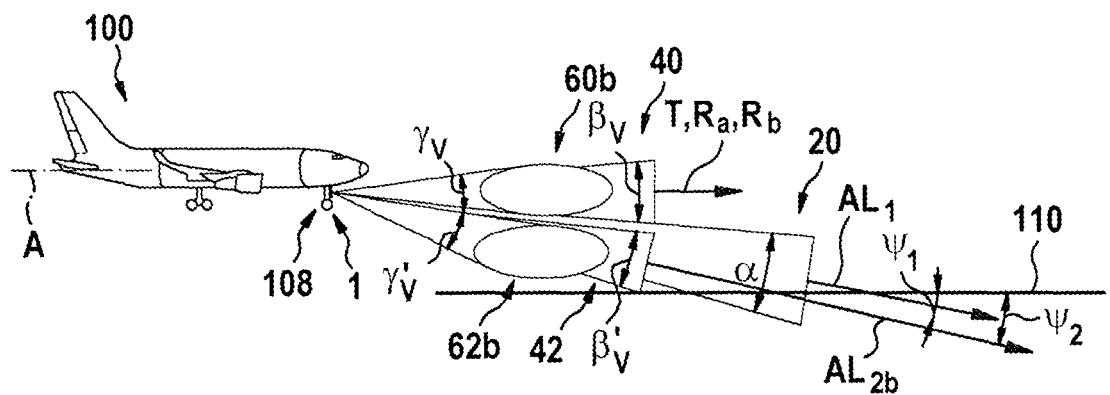
FIG. 3B depicts a side view of the aircraft depicted in FIG. 3A during the landing approach.

FIGS. 3A and 3B illustrate a landing approach of an aircraft 100 in accordance with an exemplary embodiment of the invention, the aircraft 100 comprising a set 1 of exterior aircraft lights according to an exemplary embodiment of the invention. FIG. 3A is a perspective top view of the aircraft 100, and FIG. 3B is a side view thereof.

Similar to a conventional set of exterior aircraft lights, the set 1 of exterior aircraft lights according to an exemplary embodiment of the invention includes a main landing light 2, a taxi light 4, and at least one runway turn-off light 6a, 6b.

In the set 1 of exterior aircraft lights according to an exemplary embodiment of the invention, the main landing light 2 is configured similar to a conventional main landing light 2, as it has been described with respect to FIGS. 2A and 2B. Therefore, the main landing light 2 is not described in detail again.

The taxi light 4 and the runway turn-off lights 6a, 6b are configured for emitting a taxi light beam 40 and runway turn-off light beams 60a, 60b, respectively, as it has been described with respect to FIGS. 2A and 2B as well. Therefore, the taxi light beam 40 and runway turn-off light beams 60a, 60b are not described in detail again.

The taxi light 4 of the set 1 of exterior aircraft lights according to an exemplary embodiment of the invention is configured to additionally emit a first auxiliary landing light beam 42, also referred to as taxi light auxiliary landing light beam, around a first auxiliary landing light beam direction $AL_1$.

The first auxiliary landing light beam direction $AL_1$, when projected onto a vertical plane, is angled downwards at an angle $\psi_1$ between 5° and 15°, in particularly an angle $\psi_1$ of 10°, with respect to the straight-ahead direction (see FIG.

3B). When projected onto a horizontal plane (see FIG. 3A), the first auxiliary landing light beam direction $AL_1$ is oriented in the straight-ahead direction, i.e. along or parallel to the longitudinal axis A of the aircraft 100.

In the vertical plane, the first auxiliary landing light beam 42 has a vertical opening angle $\beta'_V$, which is similar to the vertical opening angle $\beta_V$ of the taxi light beam 42, i.e. a vertical opening angle $\beta'_V$ in the range of between 10° and 30° in particular a vertical opening angle $\beta'_V$ angle of approximately 20°, i.e. +/−10°, with respect to the first auxiliary landing light beam direction $AL_1$ (see FIG. 3B).

In the horizontal plane, the first auxiliary landing light beam 42 has a horizontal opening angle $\beta'H$, which is similar to the horizontal opening angle $\beta_H$ of the taxi light beam 42, i.e. a horizontal opening angle $\beta'H$ in the range of between 30° and 50°, in particular a horizontal opening angle $\beta'H$ of approximately 40°, i.e. +/−20°, with respect to the first auxiliary landing light beam direction $AL_1$ (see FIG. 3A).

The taxi light beam 40 and the first auxiliary landing light beam 42 are controllable independently of each other. The first auxiliary landing light beam 42 may in particular be activated and deactivated independently from the taxi light beam 40 and vice versa.

The runway turn-off lights 6a, 6b of the set 1 of exterior aircraft lights according to an exemplary embodiment of the invention are each configured for emitting a second auxiliary landing light beam 62a, 62b around a second auxiliary landing light beam direction $AL_{2a}$, $AL_{2b}$.

When projected onto the vertical plane, the second auxiliary landing light beam directions $AL_{2a}$, $AL_{2b}$ are angled downwards at an angle $\Phi_2$ between 5° and 15°, in particularly at an angle $\psi_2$ of 10°, with respect to the straight ahead direction (see FIG. 3B). When projected onto the horizontal plane, the second auxiliary landing light beam direction $AL_{2a}$, $AL_{2b}$ is oriented along or parallel to the respective runway turn-off light beam direction $RT_a$, $RT_b$ (see FIG. 3A).

In the vertical plane, each of the second auxiliary landing light beams 62a, 62b has a vertical opening angle $\gamma'_V$ in the range of between 10° and 30°, in particular a vertical opening angle $\gamma'_V$ of approximately 20°, i.e. a vertical opening angle $\gamma'_V$ of +/−10°, with respect to the respective the second auxiliary landing light beam direction $AL_{2a}$, $AL_{2b}$ (see FIG. 3B).

In the horizontal plane, each of the second auxiliary landing light beams 62a, 62b has a horizontal opening angle $\gamma'H$ in the range of between 30° and 50°, in particular a vertical opening angle $\gamma'H$ of approximately 40°, i.e. a horizontal opening angle $\gamma'H$ of +/−20°, with respect to the respective the second auxiliary landing light beam direction $AL_{2a}$, $AL_{2b}$ (see FIG. 3A).

In each runway turn-off light 6a, 6b, the respective runway turn-off light beam 60a, 60b and the respective second auxiliary landing light beam 62a, 62b are controllable independently of each other. The second auxiliary landing light beam 62a, 62b may in particular be activated independently from the runway turn-off light beam 60a, 60b and vice versa.

The first and second auxiliary landing light beams 42, 62a, 62b, which are inclined towards the ground 110 similar to the main landing light beam 20, provide additional illumination of an area of the ground, such as a runway, 110 in front of the aircraft 100, in particular in situations in which the longitudinal axis A of the aircraft 100, when projected onto the horizontal plane, is not oriented parallel to the direction of flight, as it is shown in FIGS. 2A and 3A.

As a result, by employing a set 1 of external aircraft lights according to an exemplary embodiment of the invention, the illumination of the ground 110 in front of the aircraft 100, and in consequence the safety of the aircraft 100, may be considerably enhanced, in particular during cross-wind landings, in which the projection of the longitudinal axis A of the aircraft 100 onto the horizontal plane is inclined with respect to the direction of flight.

The light intensities of the first and second auxiliary landing light beams 42, 62a, 62b may be similar to, in particular within 50% and 150%, of the light intensities of the taxi light beam 40 and the runway turn-off light beams 60a, 60b.

Figure 4:
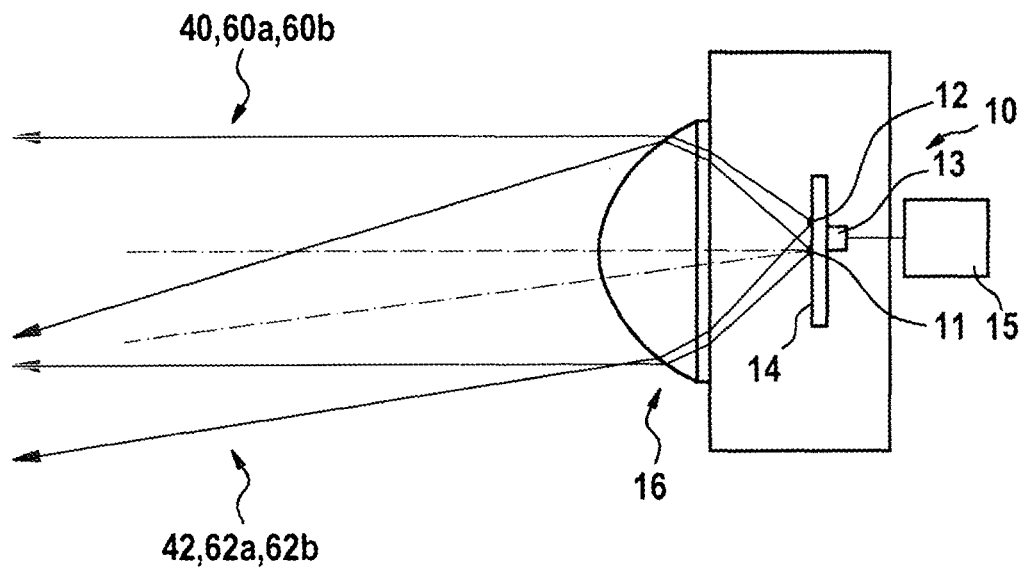
FIG. 4 depicts a schematic cross-sectional view of an exterior aircraft light, which may be part of a set of exterior aircraft lights according to an exemplary embodiment of the invention.

FIG. 4 depicts a schematic cross-sectional view of an exterior aircraft light 10 according to an exemplary embodiment of the invention. The exterior aircraft light 10, depicted in FIG. 4, may be employed as a taxi light 4 or as a runway turn-off light 6a, 6b of a set of exterior aircraft lights according to an exemplary embodiment of the invention.

The exterior aircraft light 10 comprises a light source carrier 14, supporting at least two light sources 11, 12. Alternatively, the light sources 11, 12 may be supported by individual light source carriers.

The at least two light sources 11, 12 include at least one first light source 11, which may be at least one taxi light source 11 or at least one runway turn-off light source 11, configured for emitting light for a taxi light beam 40 or a runway turn-off light beam 60a, 60b, respectively.

The at least two light sources 11, 12 further include at least one auxiliary landing light source 12, which may be at least one first auxiliary landing light source 12, also referred to as taxi light landing light source, or at least one second auxiliary light source 12, also referred to as runway turn-off light landing light source. The at least one auxiliary landing light source 12 is configured for emitting light for a first auxiliary landing light beam 42 or a second auxiliary landing light beam 62a, 62b, respectively.

The first and second light sources 11, 12 are controllable independently of each other. The at least one first light source 11 may in particular be activated and deactivated independently from the at least one second light source 12, and the at least one second light source 12 may be activated and deactivated independently from the at least one first light source 11, respectively.

The exterior aircraft light 10 also comprises at least one optical element, such as a lens 16 and/or a reflector, which is configured for forming the light, emitted by the light sources 11, 12, into the respective light beams 40, 42, 60a, 60b, 62a, 62b. Although a common optical element for both lights sources 11, 12 is shown in FIG. 4, in alternative embodiments, which are not depicted in the figures, separate optical elements may be assigned to each light source 11, 12 or to each group of light sources 11, 12, respectively.

In the configuration depicted in FIG. 4, the at least one second light source 12 is arranged above the at least one first light source 11. In consequence, the light beam 42, 62a, 62b, formed from the light emitted by the at least one second light source 12, is oriented downwards with respect to the light beam 40, 60a, 60b, generated by the at least one first light source 11. As a result, the light beam 42, 62a, 62b, formed from the light emitted by the at least one second light source 12, is a first or second auxiliary landing light beam 42, 62a, 62b, illuminating the ground 110 in front of the aircraft 100 during a landing approach, as it has been described with respect to FIGS. 3A and 3B.

The structural configuration of the exterior aircraft light 10 is depicted only schematically in FIG. 4. Other spatial arrangements of the first and second light sources 11, 12 and the one or more optical elements, resulting in a desired light distribution, emitted from the exterior aircraft light 10, are possible as well. Alternative configurations may in particular include additional light sources and/or additional/alternative optical elements.

The exterior aircraft light 10 further includes a temperature sensor 13 and a controller 15. The temperature sensor 13 is configured for detecting a temperature T of the exterior aircraft light 10, in particular a temperature T in an area close to the first and second light sources 11, 12. The controller 15 is configured for controlling the operation of the first and second light sources 11, 12. The controller 15 is in particular configured for controlling the operation of the first and second light sources 11, 12, based on the temperature T detected by the temperature sensor 13.

An example of a method of controlling the operation of the first and second light sources 11, 12, based on the temperature T, detected by the temperature sensor 13, is described in the following with reference to FIG. 5.

Figure 5:
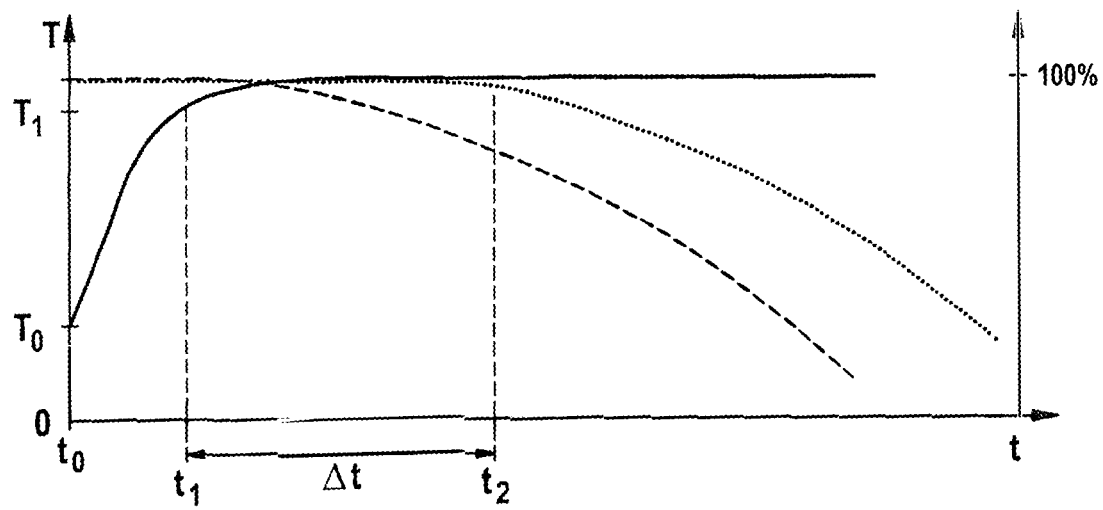
FIG. 5 is a diagram showing a temperature of the exterior aircraft light as well as the light intensities, emitted by the light sources of the exterior aircraft light, as functions of time.

FIG. 5 shows a diagram in which the temperature T, detected by the temperature sensor 13 (solid curve), as well as the light intensities of the at least one first light source 11 (dotted curve) and of the at least one second light source 12 (dashed curve) are plotted on the vertical axis as functions of time t, which is plotted on the horizontal axis.

At the beginning ($t_0$=0), when the external aircraft light 10 is switched on, the temperature T detected by the temperature sensor 13 is a starting temperature $T_0$, which is basically identical with the ambient temperature $T_{amb}$, and the first and second light sources 11, 12 are operated with full power, producing their respective maximum light intensities of 100%.

Due to the operation of the first and second light sources 11, 12, the temperature T, detected by the temperature sensor 13, increases over time t, as illustrated in FIG. 5 by the ascending solid line.

An excessive temperature of the exterior aircraft light 10, in particular of the first and second light sources 11, 12, may result in damaging the first and second light sources 11, 12. Thus, in case the temperature T, detected by the temperature sensor 13, exceeds a predefined temperature threshold value $T_1$, which happens at $t_1$ in the exemplary situation of FIG. 5, the controller 15 reduces the power supplied to the at least one second light source 12. In consequence, the intensity of light emitted by the at least one second light source 12 (dashed curve) falls below 100%.

At this point, the at least one first light source 11, generating the light for the taxi light beam 40 or for the runway turn-off light beam 60a, 60b, respectively, is still operated with full power, generating a light intensity of 100% (dotted line).

In case, however, the detected temperature T exceeds the predefined temperature threshold value $T_1$ for a predetermined amount of time $\Delta t = t_2 - t_1$, even after the power supplied to the at least one first light source 11 source has been reduced at $t_1$, the power supplied to the at least one second light source 12 is reduced as well, thereby reducing the intensity of light emitted by the at least one second light source 12, in order to avoid damaging the first and second light sources 11, 12 due to overheating.

Controlling the operation of the first and second light sources 11, 12 based on the temperature T, detected by the temperature sensor 13, as it has been described, allows for an automatic operation of the at least one second light source 12. In particular, it allows for automatically deactivating the at least one second light source 12 after the aircraft 100 has landed.

All of the first and second light sources 11, 12 of the exterior aircraft light may be activated during the landing approach, i.e. when the aircraft 100 is still in flight (see FIGS. 2A, 2B, 3A, 3B). Due to the still relatively fast movement of the aircraft 100 during the landing approach, a flow of ambient air passes the exterior aircraft light 10, which is sufficiently large for cooling the exterior aircraft light 10, even if the first and second light sources 11, 12 are operated at 100%. Thus, while the aircraft is still in the air during the landing approach, the temperature T, detected by the temperature sensor 13, will not reach the predefined temperature threshold value $T_1$, and in consequence the first and second light sources 11, 12 are operated with their maximum capacities of 100%.

However, when the aircraft 100 is taxiing after landing, the aircraft moves considerably slower than during the landing approach. In consequence, the cooling airflow, passing the exterior aircraft light 10, is considerably reduced as well. The reduced cooling, provided by the air flow, results in an increase of the temperature T within the exterior aircraft light 10 (cf. FIG. 5), which is detected by the temperature sensor 13.

In consequence, some-time after the aircraft 100 has landed, the at least one second light source 12, provided for generating the light for the first or second auxiliary landing light beams 42, 62a, 62b, which are no longer needed after the aircraft 100 has landed, is dimmed or even completely switched-off automatically without the need for human intervention.

If the aircraft 100 has landed in a very cold environment, so that the temperature T, detected by the temperature sensor 13, does not exceed the predefined temperature threshold value $T_1$ even after the aircraft 100 has landed, the at least one second light source 12 will not be switched off automatically. This, however, will not be an issue, because the first and second auxiliary landing light beams 42, 62a, 62b are oriented downwards towards the ground 110, so that they are not visible to pilots of other aircraft 100 and do not cause any glare.

Figure 6A:
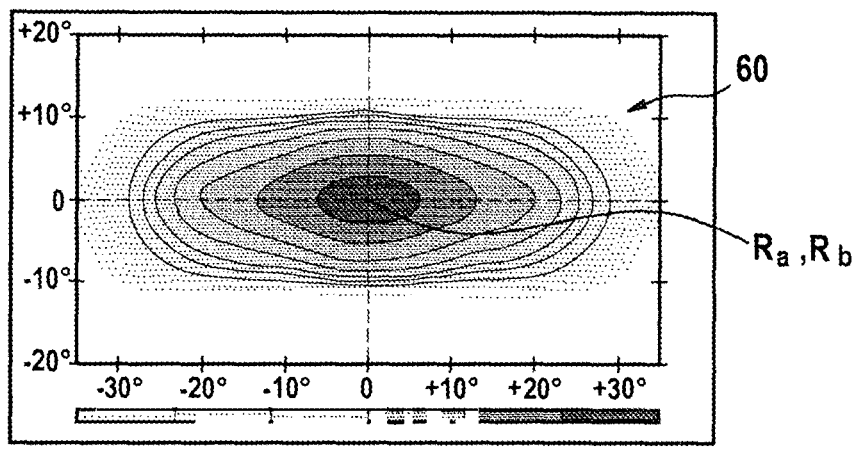
FIGS. 6A to 6C show examples of light intensity distributions of a runway turn-off light, which may be part of a set of exterior aircraft lights according to an exemplary embodiment of the invention.
Figure 6B:
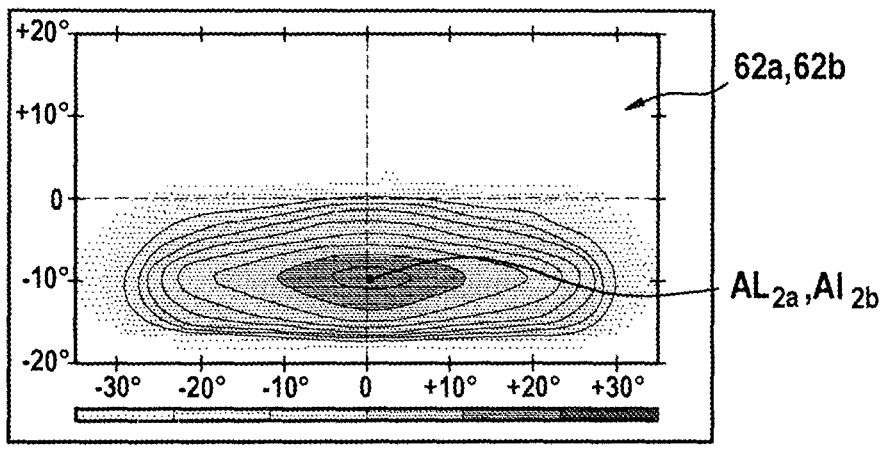
Figure 6C:
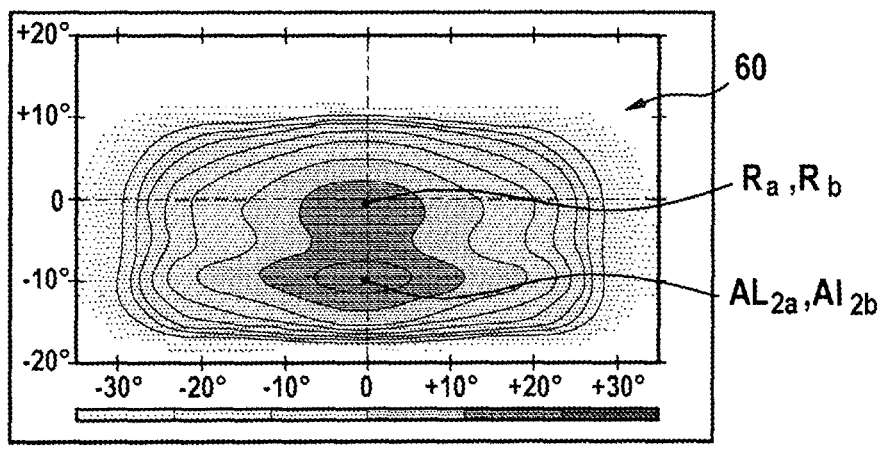

FIGS. 6A to 6C illustrate examples of the light intensity distribution of a runway turn-off light 6a, 6b, as may be used in a set of exterior aircraft lights according to an exemplary embodiment of the invention.

FIG. 6A illustrates the light intensity distribution of the runway turn-off light beam 60a, 60b, extending around a runway turn-off light beam direction $R_a$, $R_b$. The runway turn-off light beam 60a, 60b has a horizontal opening angle $\gamma_H$ in the range of between 30° and 50°, in particular a horizontal opening angle $\gamma_H$ of about 40° (about +/−20°), and a vertical opening angle $\gamma_V$ in the range of between 10° and 30°, in particular a vertical opening angle $\gamma_V$ of about 20° (about +/−10°).

FIG. 6B illustrates the light distribution of a second auxiliary landing light beam 62a, 62b, which is emitted by a runway turn-off light 6a, 6b of a set of exterior aircraft lights according to an exemplary embodiment of the invention in addition to the runway turn-off light beam 60a, 60b, depicted in FIG. 6A.

The second auxiliary landing light beam 62a, 62b extends around a runway turn-off light beam direction $AL_{2a}$, $AL_{2b}$. FIG. 6B shows that the runway turn-off light beam direction $AL_{2a}$, $AL_{2b}$ is inclined 10° downwards from the runway turn-off light beam direction $R_a$, $R_b$ in the vertical plane.

The second auxiliary landing light beam 62a, 62b has a horizontal opening angle $\gamma'_H$ in the range of between 30° and 50°, in particular a horizontal opening angle $\gamma'_H$ of about 40° (about +/−20°), and a vertical opening angle $\gamma'_V$ in the range of between 10° and 30°, in particular a vertical opening angle $\gamma'_V$ of about 20°.

FIG. 6C illustrates the combined light distribution of the runway turn-off light beam 40 and the second auxiliary landing light beam 62a, 62b, as it is emitted by a runway turn-off light 6a, 6b as part of a set of exterior aircraft lights according to an exemplary embodiment of the invention.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

What is claimed is:

1. A set of exterior aircraft lights, comprising:
   a main landing light, which comprises at least one main landing light source and is configured for emitting a main landing light beam around a main landing light beam direction (L);
   and at least one of a taxi light,
   wherein the taxi light comprises at least one taxi light source supported by a light source carrier and wherein the at least one taxi light source is configured for emitting a taxi light beam around a taxi light beam direction (T), wherein the taxi light beam direction (T) is oriented in a straight-ahead direction;
   wherein the taxi light further comprises at least one first auxiliary landing light source supported by the light source carrier, wherein the at least one first auxiliary landing light source is configured for emitting a first auxiliary landing light beam around a first auxiliary landing light beam direction (AL1), and wherein the first auxiliary landing light beam direction (AL1), when projected onto a vertical plane, is angled downwards between 5° and 15° with respect to the straight ahead direction;
   wherein the at least one taxi light source and the at least one first auxiliary landing light source are controllable independently of each other;
   and a runway turn-off light,
   wherein the runway turn-off light comprises at least one runway turn-off light source supported by the light source carrier, wherein the at least one runway turn-off light source is configured for emitting a runway turn-off light beam around a runway turn-off light beam direction (Ra, Rb), and wherein the runway turn-off light beam direction (Ra, Rb), when projected onto a horizontal plane, is oriented at an angle ($\Theta$) between 30° and 60° with respect to the straight ahead direction;
   wherein the runway turn-off light further comprises at least one second auxiliary landing light source supported by the light source carrier, wherein the at least one second auxiliary landing light source is configured for emitting a second auxiliary landing light beam around a second auxiliary landing light beam direction (AL2a, AL2b), wherein the second auxiliary landing light beam direction (AL2a, AL2b), when projected onto a vertical plane, is angled downwards between 5° and 15° with respect to the runway turn-off light beam direction (Ra, Rb), and wherein the second auxiliary landing light beam direction (AL2a, AL2b), when projected onto a horizontal plane, is oriented at an angle ($\Theta$) between 30° and 60° with respect to the straight ahead direction;
   wherein the at least one runway turn-off light source and the at least one second auxiliary landing light source are controllable independently of each other.

2. The set of exterior aircraft lights according to claim 1, wherein the main landing light beam direction (L) is in a straight ahead direction and wherein the runway turn-off light beam direction (Ra, Rb) and the second auxiliary landing light beam direction (AL2a, AL2b), when projected onto a horizontal plane, are oriented at an angle ($\Theta$) between 40° and 50° with respect to the straight-ahead direction.

3. The set of exterior aircraft lights according to claim 1, further comprising
   a taxi light temperature sensor, which is configured for detecting a temperature (T) at the taxi light; and
   a taxi light controller, which is configured for controlling the operation of the at least one taxi light source or the operation of the at least one first auxiliary landing light source as a function of the temperature detected by the taxi light temperature sensor, wherein the taxi light controller is configured for dimming or deactivating the at least one first auxiliary landing light source when the temperature detected by the taxi light temperature sensor exceeds a predefined taxi light temperature threshold value (T1).

4. The set of exterior aircraft lights according to claim 1, further comprising
   a runway turn-off light temperature sensor, which is configured for detecting a temperature at the runway turn-off light; and
   a runway turn-off light controller, which is configured for controlling the operation of the at least one runway turn-off light source or the operation of the at least one second auxiliary landing light source as a function of the temperature detected by the runway turn-off light temperature sensor,
   wherein the runway turn-off light controller is configured for dimming or deactivating the at least one second auxiliary landing light source when the temperature detected by the runway turn-off light temperature sensor exceeds a predefined runway turn-off light temperature threshold value (T1).

5. The set of exterior aircraft lights according to claim 1, wherein the taxi light comprises at least one optical element, wherein the at least one optical element is at least one lens or at least one reflector, and wherein the at least one optical element is configured for forming the taxi light beam and the first auxiliary landing light beam from the light emitted by the at least one taxi light source and the light emitted by the at least one first auxiliary landing light source.

6. The set of exterior aircraft lights according to claim 1, wherein the runway turn-off light comprises at least one optical element, wherein the at least one optical element is at least one lens or at least one reflector, and wherein the at least one optical element is configured for forming the runway turn-off light beam and the second auxiliary landing light beam from the light emitted by the at least one runway turn-off light source and the light emitted by the at least one second auxiliary landing light source.

7. The aircraft comprising a set of exterior aircraft lights according to claim 1, wherein the main landing light is mounted to a front landing gear of the aircraft and/or and wherein the taxi light or the runway turn-off light is mounted to the front landing gear of the aircraft or to a wing root region of the aircraft.

8. The aircraft according to claim 7, having a fuselage whose longitudinal axis (A) of extension substantially corresponds to the straight-ahead direction.

9. The aircraft according to claim 7, comprising two runway turn-off lights, wherein the runway turn-off light beam directions of the two runway turn-off lights diverge symmetrically on both sides of the straight-ahead direction.

10. The aircraft according to any of claim 7, wherein the main landing light beam direction (L) is oriented downwards with respect to the straight-ahead direction.

11. The aircraft according to claim 10, wherein the main landing light beam direction (L) is oriented downwards at an angle ($\varphi$) between 5° and 15°, with respect to the straight-ahead direction.

12. A method of operating a set of exterior aircraft lights according to claim 1, wherein the method includes simultaneously operating the at least one main landing light source together with at least one of the at least one taxi light source and the at least one runway turn-off light source, and together with at least one of the at least one first auxiliary landing light source and the at least one second auxiliary landing light source.

13. The method of operating a set of exterior aircraft lights according to claim 12, wherein the method includes activating the at least one main landing light source together with said at least one of the at least one taxi light source and the at least one runway turn-off light source, and together with said at least one of the at least one first auxiliary landing light source and the at least one second auxiliary landing light source, during a landing approach.

14. The method of operating a set of exterior aircraft lights according to claim 12, wherein the method includes monitoring a temperature (T) of the taxi light or a temperature (T) of the runway turn-off light, and wherein the method further includes dimming or deactivating the at least one first auxiliary landing light source or the at least one second auxiliary landing light source if the detected temperature (T) exceeds a predefined temperature threshold value (T1).

15. The method of operating a set of exterior aircraft lights according to claim 14, wherein the method further includes dimming or deactivating the at least one taxi light source or the at least one runway turn-off light source if the detected temperature (T) exceeds the predefined temperature threshold value (T1) for a predetermined amount of time, after the at least one first auxiliary landing light source or the at least one second auxiliary landing light source have been dimmed or deactivated.

* * * * *